(12) United States Patent
Steward et al.

(10) Patent No.: US 9,267,804 B1
(45) Date of Patent: Feb. 23, 2016

(54) FORWARD DEPTH DISPLAY

(71) Applicant: Navico Holding AS, Egersund (NO)

(72) Inventors: Lucas Dale Steward, Broken Arrow, OK (US); John Scott, Auckland (NZ)

(73) Assignee: Navico Holding AS, Egersund (NO)

( * ) Notice: Subject to any disclaimer, the term of this patent is extended or adjusted under 35 U.S.C. 154(b) by 0 days.

(21) Appl. No.: 14/495,367

(22) Filed: Sep. 24, 2014

(51) Int. Cl.
*G01C 21/00* (2006.01)
*G01V 1/00* (2006.01)
*G01C 21/32* (2006.01)
*G01C 13/00* (2006.01)

(52) U.S. Cl.
CPC .............. *G01C 21/32* (2013.01); *G01C 13/008* (2013.01)

(58) Field of Classification Search
CPC ........... G01S 15/08; G01S 15/87; G01V 1/38; G01V 1/3808; G01V 1/345; G01V 1/325; G06F 17/5018
USPC .......... 701/454; 367/127, 124, 15, 99, 33, 68, 367/9; 348/116, 113; 702/5, 2, 18, 166, 702/152, 153, 142
See application file for complete search history.

(56) References Cited

U.S. PATENT DOCUMENTS

| | | | | | |
|---|---|---|---|---|---|
| 3,187,704 | A | * | 6/1965 | Shatto, Jr. ............ | G05D 1/0208 114/144 B |
| 4,312,053 | A | * | 1/1982 | Lipsky ...................... | G01S 5/20 367/127 |
| 7,366,056 | B2 | * | 4/2008 | Frivik ..................... | G01S 15/08 367/106 |
| 8,949,096 | B2 | * | 2/2015 | Jolliff .................. | G06F 17/5009 703/2 |
| 2002/0157833 | A1 | * | 10/2002 | Wilson .................... | B63B 21/50 166/344 |
| 2008/0008042 | A1 | * | 1/2008 | Frivik ..................... | G01S 15/08 367/99 |
| 2014/0216325 | A1 | * | 8/2014 | Hardy ................... | B63G 8/001 114/321 |

FOREIGN PATENT DOCUMENTS

JP  2006-0647700  * 2/2006

* cited by examiner

*Primary Examiner* — Muhammad Shafi
(74) *Attorney, Agent, or Firm* — Pramudji Law Group PLLC; Ari Pramudji

(57) ABSTRACT

Various implementations described herein are directed to a non-transitory computer readable medium having stored thereon computer-executable instructions which, when executed by a computer, may cause the computer to receive a location and heading of a vessel. The computer may retrieve a bathymetric chart corresponding to the location. The computer may analyze the bathymetric chart, location and heading to determine depths at a plurality of locations in front of the vessel. The computer may also display the depths.

17 Claims, 6 Drawing Sheets

FORWARD DEPTH DISPLAY

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Bathymetric charts are frequently referenced while operating a marine vessel or when determining a course for a marine vessel. Bathymetric charts provide information regarding submerged terrain. A bathymetric chart may be used to determine the depth of water in a lake, river, or ocean. A Global Positioning System (GPS) may also be used for navigation while operating a marine vessel. A GPS may be used to determine, among other things, the location of a vessel, the heading of the vessel, and the speed of the vessel.

SUMMARY

Described herein are implementations of various technologies for analyzing a bathymetric chart to determine depths at a plurality of locations in front of a vessel. In one implementation, a non-transitory computer-readable medium having stored thereon computer-executable instructions which, when executed by a computer, cause the computer to perform various actions. The actions may include receiving a location and heading of a vessel. The actions may include retrieving a bathymetric chart corresponding to the location. The actions may include analyzing the bathymetric chart, location and heading to determine depths at a plurality of locations in front of the vessel. The actions may also include displaying the depths.

Described herein are also implementations of various technologies for analyzing a bathymetric chart to determine depths at a plurality of locations in front of a vessel and displaying a warning if at least one of the depths is less than a minimum depth. In one implementation, a non-transitory computer-readable medium having stored thereon computer-executable instructions which, when executed by a computer, cause the computer to perform various actions. The actions may include receiving a location and heading of a vessel. The actions may include receiving a minimum depth. The actions may include retrieving a bathymetric chart corresponding to the location. The actions may include analyzing the bathymetric chart, location and heading to determine depths at a plurality of locations in front of the vessel. The actions may include comparing the depths to the minimum depth. The actions may also include displaying a warning if at least one of the depths is less than the minimum depth.

Described herein are also implementations of various technologies for an apparatus for displaying marine electronic navigation data. The apparatus includes one or more processors, a screen, and a memory. The memory has a plurality of executable instructions. When the executable instructions are executed by the one or more processors, the processors may receive a location and heading of a vessel. The processors may retrieve a bathymetric chart corresponding to the location. The processors may analyze the bathymetric chart, location and heading to determine depths at a plurality of locations in front of the vessel. The processors may also display the depths on the screen.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1A:
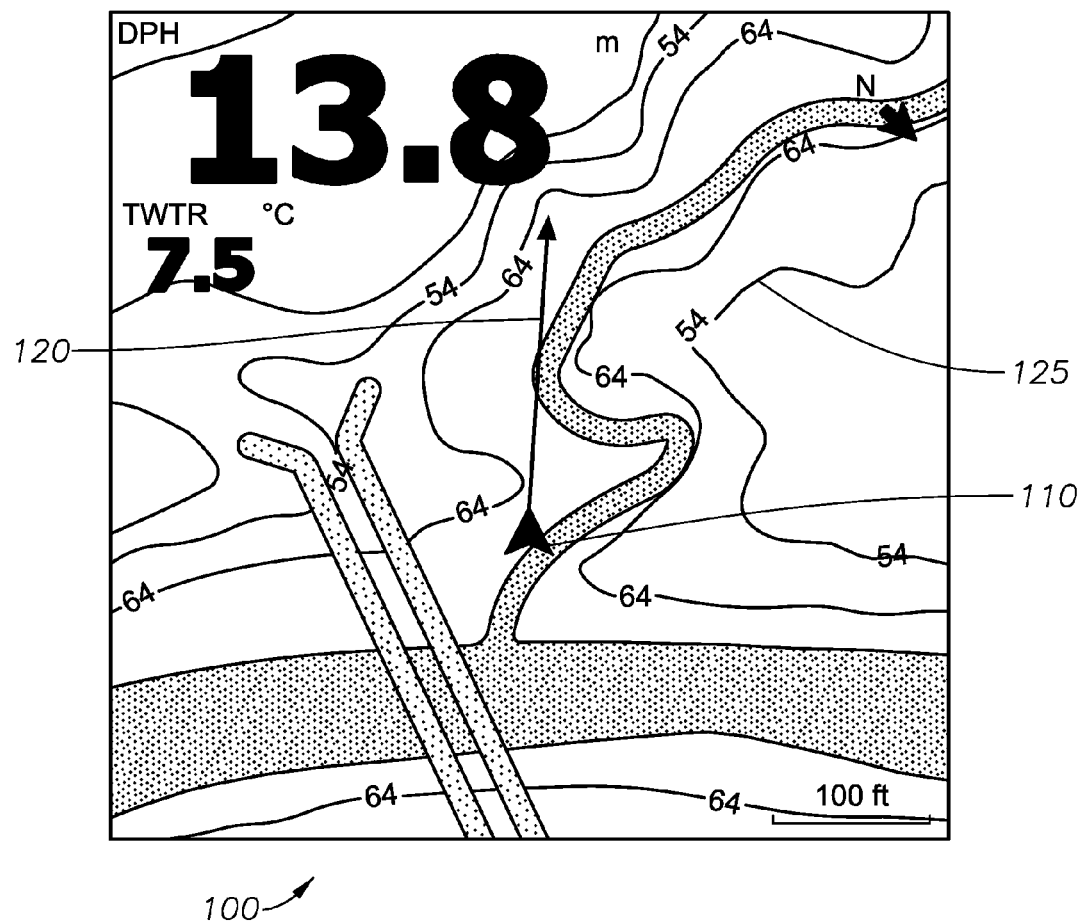
FIG. 1A illustrates a bathymetric chart display in accordance with various implementations described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations of a forward depth display described herein will now be described in more detail with reference to FIGS. 1-7.

FIG. 1A illustrates a bathymetric chart display 100 in accordance with various implementations described herein. The bathymetric chart display 100 may be displayed on a marine electronics device as described in FIG. 7, a computer system as described in FIG. 6, or any other display device.

Bathymetric chart display 100 displays a map of a water feature along with depth contours 125 which correspond to depths of the water feature. Examples of water features that may be represented using a bathymetric chart display 100 include lakes, rivers and oceans. The bathymetric chart also shows the location of a vessel 110, and a heading extension 120 showing the heading of the vessel 110. The location of the vessel may be measured using a GPS. The heading may be measured using a compass or GPS. The bathymetric chart 100 and contours 125 may be used to determine the depth at a particular location. For example, in FIG. 1A, the depth of the water at the location of the vessel 110 is approximately 64 feet.

Figure 1B:
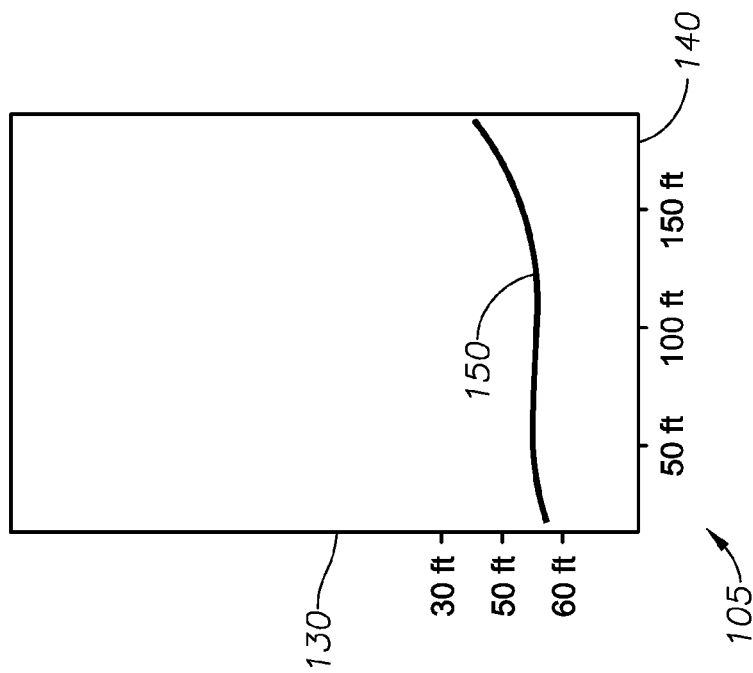
FIG. 1B illustrates a forward depth display in accordance with implementations of various techniques described herein.

FIG. 1B illustrates a forward depth display 105 in accordance with implementations of various techniques described herein. The forward depth display 105 may be displayed on a marine electronics device as described in FIG. 7, a computer system as described in FIG. 6, or any other display device. In one implementation, bathymetric chart display 100 and forward depth display 105 may be displayed side by side on a marine electronics device 700.

Forward depth display 105 may be used to display the depth of water in front of a marine vessel. The depths at locations in front of the vessel may be displayed using a depth line 150, which may also be referred to as a curve. Vertical axis 130 may be used to display a scale of depths that correspond to the depth line. For example, in FIG. 1B, vertical axis 130 indicates that the depth of water in front of a vessel is between 30 feet and 60 feet. Horizontal axis 105 may be used to display a range of distance from the vessel. For example, in FIG. 1B, horizontal axis 105 indicates that the measured depths being displayed are located in a range of between approximately 0 feet and 200 feet in front of a vessel. In the illustrated display 105, the depth at the location of the vessel is approximately fifty seven feet. For example, if the vessel is located in an ocean, at the location of the vessel there is approximately fifty seven feet between the surface of the lake and the ocean floor. In the illustrated display 105, at a distance approximately two hundred feet in front of the vessel, the depth of the water is approximately forty feet. In this manner, forward depth display 105 may allow a user to easily determine the depth at the location of their vessel as well as the depth at a range of locations in front of the vessel and in the direction of the vessel's current heading.

Figure 2:
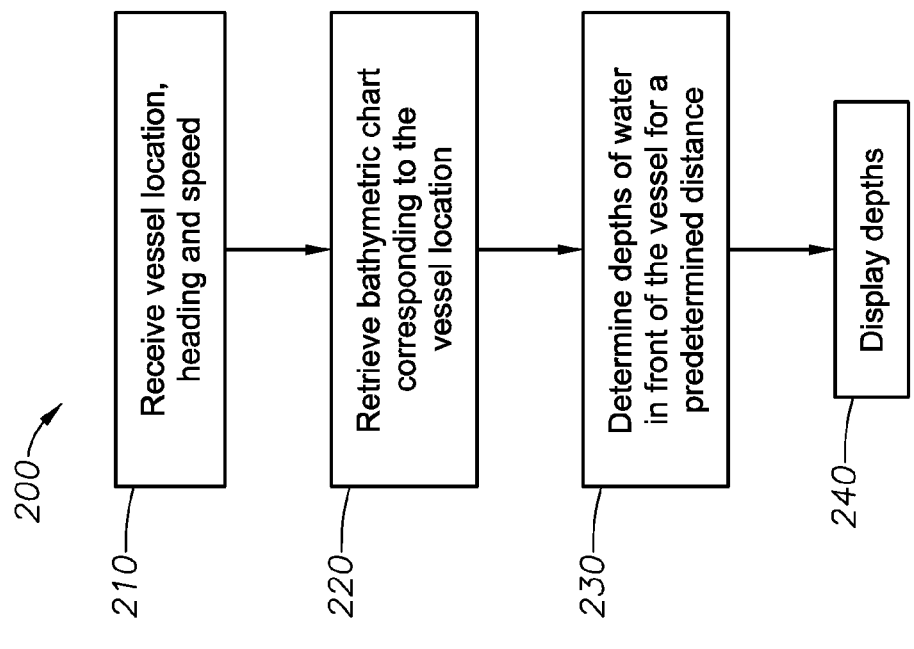
FIG. 2 is a flow diagram of a method for displaying depth information in accordance with implementations of various techniques described herein.

FIG. 2 illustrates a flow diagram of a method 200 for displaying depth information in accordance with implementations of various techniques described herein. In one implementation, method 200 may be performed by any computing device, such as computer 600 or marine electronics device 700, described below. It should be understood that while method 200 indicates a particular order of execution of operations, in some implementations, certain portions of the operations may be executed in a different order. Further, in some implementations, additional operations or steps may be added to method 200. Likewise, some operations or steps may be omitted. Additionally, the operations may be executed on more than one computer 600.

As mentioned above, the computer 600 may be loaded with a set of instructions (software) to perform method 200. At block 210, the software may receive a vessel location and heading. The software may also receive a vessel speed at block 210, but this is optional. The vessel location may be measured using a GPS. For example, a GPS receiver in a marine electronics device 700 may be used to determine the location of the vessel. The location may be received as a set of latitude and longitude coordinates. The heading may be measured by a GPS or a compass. The heading may be received as a measure of degrees. For example, zero degrees may be true north, ninety degrees may be east, and so on. The speed of the vessel may be measured using a GPS, or using data received from onboard systems, such as the engine.

At block 220, method 200 may retrieve a bathymetric chart corresponding to the vessel location received at block 210. Using the location received at block 210, a portion of a bathymetric chart may be received. For example, if method 200 is executed using a marine electronics device 700, a bathymetric chart may be stored in the memory of the marine electronics device 700 and retrieved by method 200. The retrieved portion of a bathymetric chart may be an area surrounding the location received at block 210. For example, if the bathymetric chart is stored in quadrangles, the retrieved chart may be the quadrangle that contains the location received at block 210.

At block 230, method 200 may analyze the bathymetric chart retrieved at block 220 and the vessel location and heading received at block 210 to determine the depth of water in front of the vessel. In one implementation, the depth may be determined for a set distance range in front of the vessel. For example, method 200 may determine depths corresponding to the range of zero to two hundred feet in front of the vessel. In a second implementation, the distance range may be based on the speed of the vessel. For example, if the vessel is traveling at thirty miles per hour, the distance range may be from zero to six hundred feet, whereas if the vessel is traveling at five miles per hour, the distance may be from zero to fifty feet.

In order to determine the depths, method 200 may first use the vessel location and heading to determine locations in front of the vessel. Method 200 may then determine depths corresponding to those locations using the bathymetric chart retrieved at block 220. In one implementation, the determined depths may be equivalent to the depth contours on the bathymetric chart. If the depths cannot be directly determined from the depth contours on the bathymetric chart, the depths may be estimated using the depth contours. For example, an algorithm may average two or more contours to determine the depth of the water at locations between contours.

Figure 5:
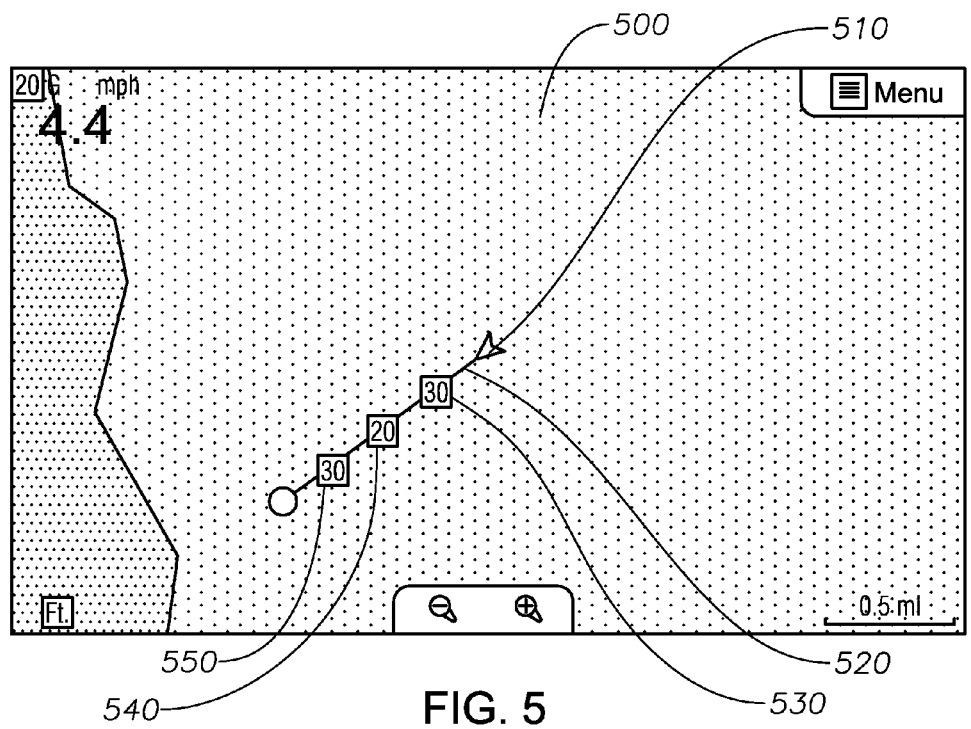
FIG. 5 illustrates a navigation chart with a heading line extension and depth information in accordance with implementations of various techniques described herein.

At block 240, method 200 may display the depths calculated at block 230. The display may be a depth display as illustrated in FIG. 1B, or a navigation chart with a heading line extension and depth information as illustrated in FIG. 5. In one implementation, the data determined at block 230 may be output as a set of distances from the vessel with corresponding depths, and that set may be used to create a display.

Figure 3:
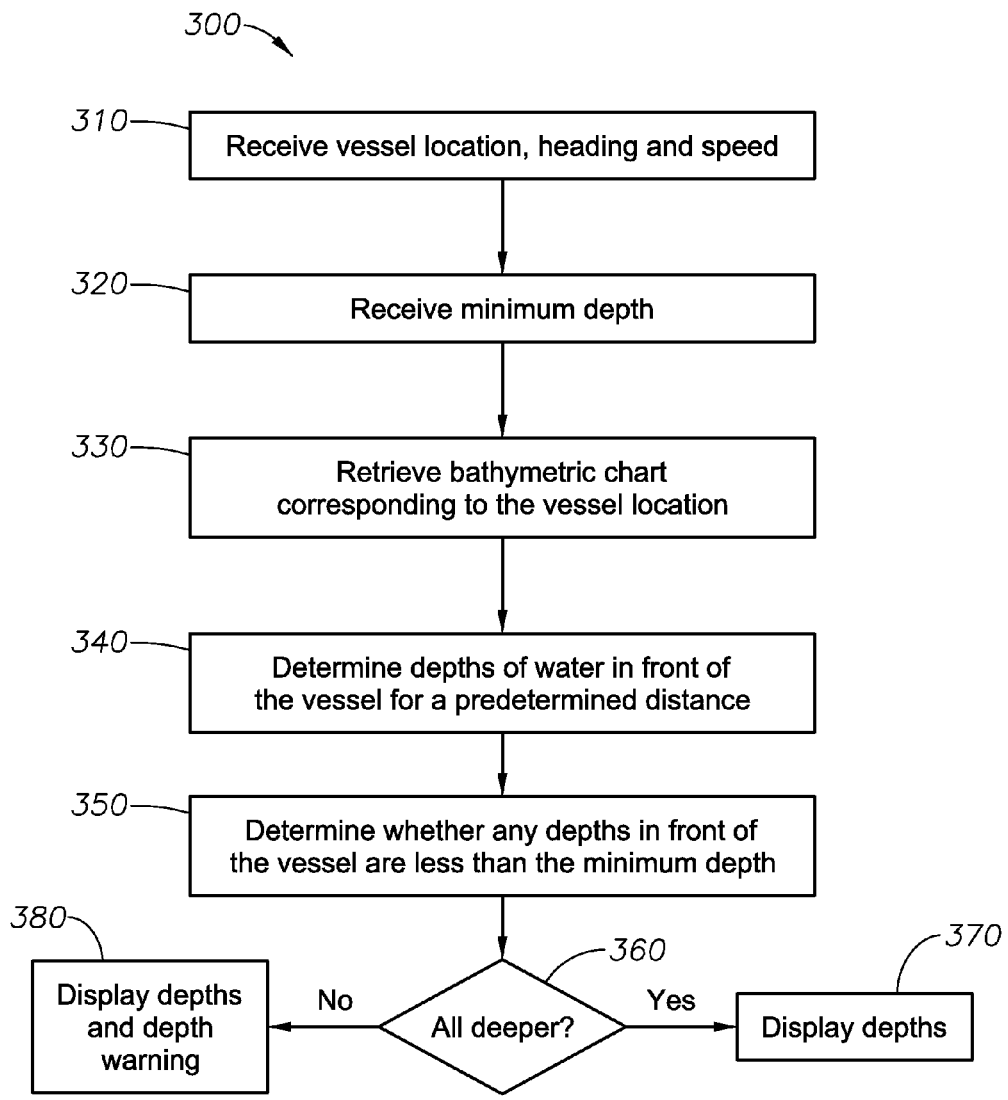
FIG. 3 is a flow diagram of a method for displaying depth information and a depth warning in accordance with implementations of various techniques described herein.

FIG. 3 is a flow diagram of a method 300 for displaying depth information and a depth warning in accordance with implementations of various techniques described herein. In one implementation, method 300 may be performed by any computing device, such as computer 600 or marine electronics device 700, described below. It should be understood that while method 300 indicates a particular order of execution of operations, in some implementations, certain portions of the operations may be executed in a different order. Further, in some implementations, additional operations or steps may be added to method 300. Likewise, some operations or steps may be omitted. Additionally, the operations may be executed on more than one computer 600.

As mentioned above, the computer 600 may be loaded with a set of instructions (software) to perform method 300. At block 310, the software may receive a vessel location and heading. Other actions similar to those at block 210, described above and in FIG. 2, may be performed at block 310.

At block 320, the method 300 may receive a minimum depth. The minimum depth may be set by a user. The minimum depth may be measured in feet, meters or any other measure of depth. For example, if a vessel requires a depth of at least fifteen feet to travel safely, the minimum depth may be set to fifteen feet. In one implementation, the minimum depth may be automatically detected or calculated using electronics on a vessel. In another implementation, the minimum depth may be entered by a manufacturer of a vessel.

At block 330, the method 300 may retrieve a bathymetric chart corresponding to the vessel location received at block 310. Other actions similar to those described at block 220 may be performed at block 330.

At block 340, the method 300 may analyze the bathymetric chart retrieved at block 330 and the vessel location and heading received at block 310 to determine the depth of water in front of the vessel. Other actions similar to those described at block 230 may be performed at block 340.

At blocks 350 and 360, method 300 may determine whether any of the depths determined or estimated at block 340 are less than the minimum depth received at block 320. For example, if the minimum depth received at block 320 is fifty feet, and one of the contours in front of the vessel is twenty feet, method 300 would determine at blocks 350 and 360 that a location in front of the vessel has a depth that is less than the minimum depth.

If the depths determined at block 340 are all deeper than the minimum depth received at block 320, the method may continue to block 370, otherwise, the method may continue to block 380.

At block 370, method 300 may display the depths calculated at block 340. The display may be a depth display as illustrated in FIG. 1B, or a navigation chart with a heading line extension and depth information as illustrated in FIG. 5.

Figure 4:
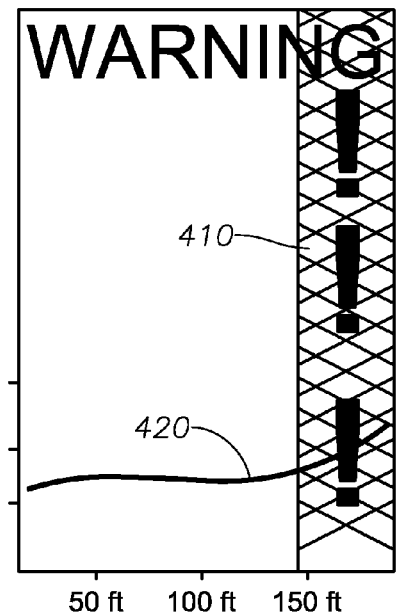
FIG. 4 illustrates a forward depth display with a depth warning in accordance with implementations of various techniques described herein.

At block 380, method 300 may display the depths calculated at block 340, and a depth warning. FIG. 4 illustrates one example of a depth display 400 with a depth warning. The depth warning may warn a user that a location in front of the vessel has a depth that is less than the minimum depth. In one implementation, the display 400 may highlight the area in which the depth is less than the minimum depth. In another implementation, the entire display may be colored red to warn a user that a depth is less than the minimum depth. In yet another implementation, an alarm may be sounded to alert a user that a depth is less than the minimum depth. In still another implementation, the autopilot may be automatically instructed to change course or stop the vessel in order to avoid any locations that are less deep than the minimum depth.

Figure 6:
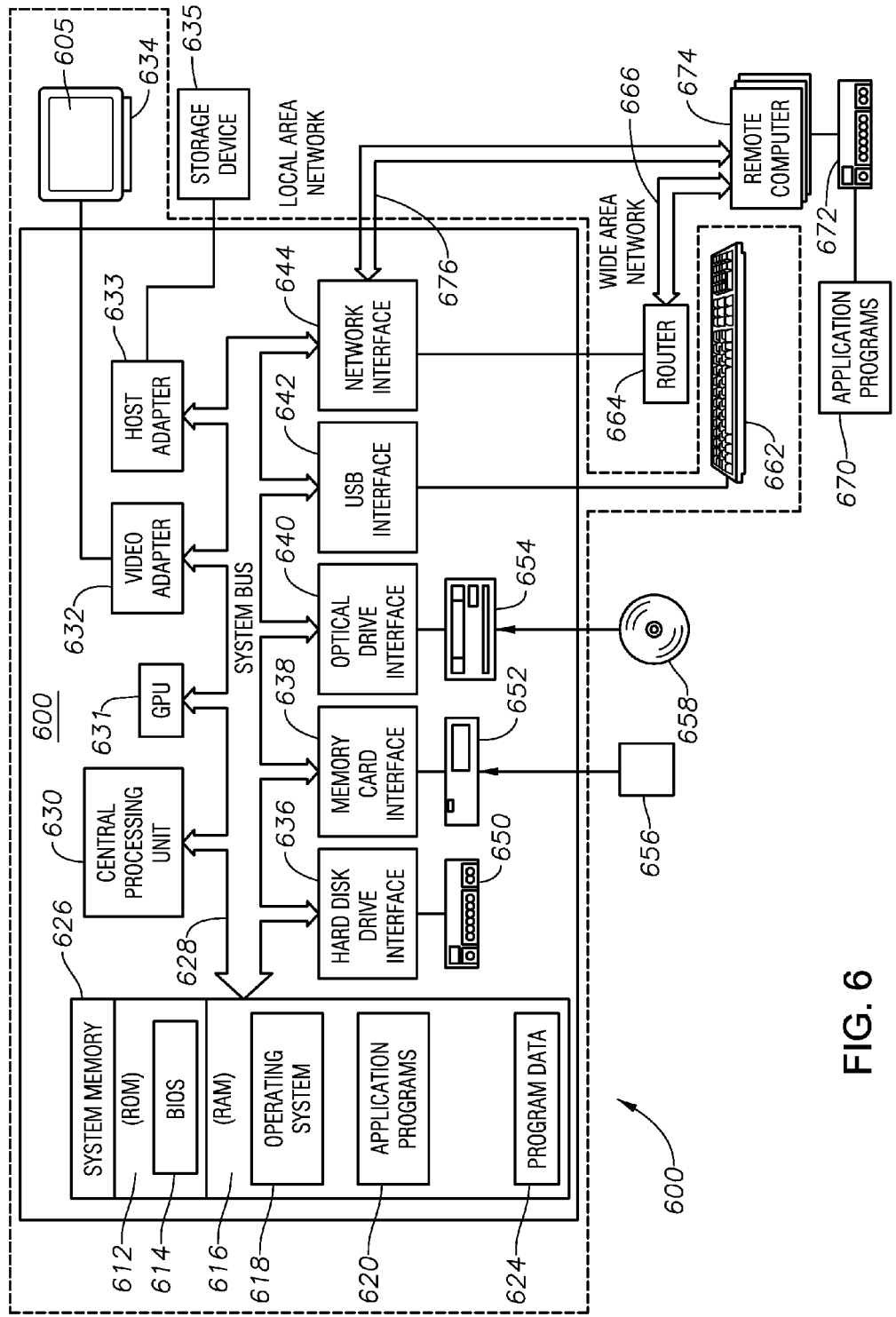
FIG. 6 illustrates a schematic diagram of a computing system in which the various technologies described herein may be incorporated and practiced.
Figure 7:
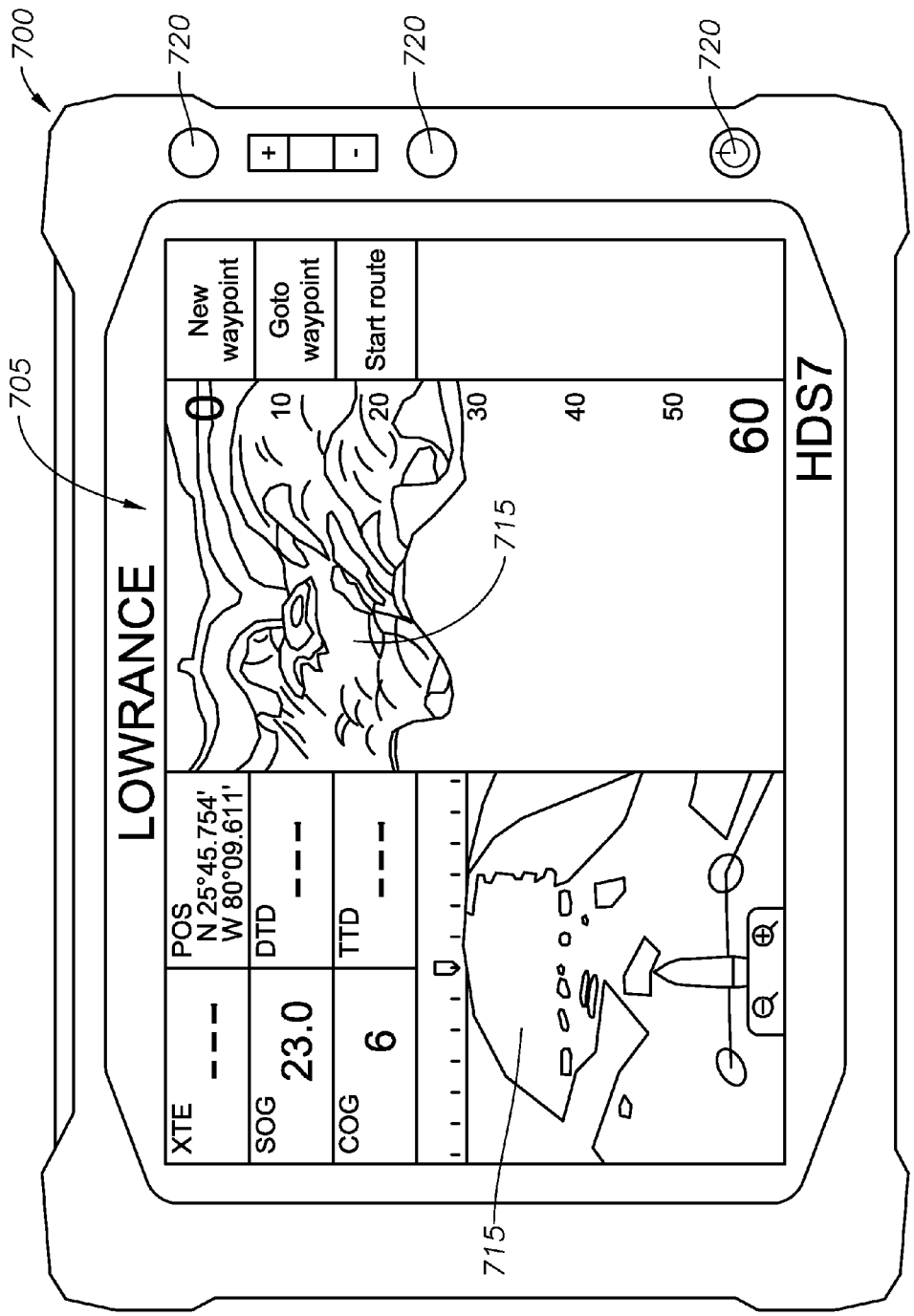
FIG. 7 illustrates a schematic of a marine electronics device in accordance with implementations of various techniques described herein.

The depth display 400 may be displayed on a marine electronics device as described in FIG. 7, a computer system as described in FIG. 6, or any other display device. In one implementation, the bathymetric chart display 100 and the depth display 400 may be displayed side by side on the marine electronics device 700.

In one implementation, the depths at locations in front of the vessel may be displayed using a depth line 420. A vertical axis may be used to display a scale of depths. A horizontal axis may be used to display a range of distances from the vessel. Section 410 of the depth display 400 indicates an area where the depth of the water is below a preset minimum depth. For example, in the depth display 400, the preset minimum depth is 55 feet. As such, the warning in section 410 corresponds to an area in front of the vessel where the depth is less than 55 feet. As mentioned earlier, the entire display may change colors when a depth in front of a vessel is less than the preset minimum depth.

FIG. 5 illustrates a navigation chart with a heading line extension and depth information in accordance with implementations of various techniques described herein. The navigation chart 500 may be displayed on a marine electronics device as described in FIG. 7, a computer system as described in FIG. 6, or any other display device.

The navigation chart 500 may be a map of the current location of the vessel. The navigation chart 500 may include a representation of the vessel 510. The navigation chart 500 may include other information, including depth contours, navigational hazards, or any other information. The navigation chart 500 may also display a line 520 in the direction of travel of the vessel 510. This line may be commonly referred to as a heading line extension. The line 520 may be used to indicate the future location of the vessel if the vessel maintains the current course.

Depth information 530, 540 and 550 may be displayed on the heading line extension 520. The depth information 530, 540 and 550 may be calculated using a bathymetric chart. For example, the depth information 530, 540 and 550 may be calculated using method 200. The depth information 530, 540 and 550 may be displayed as numerical values on the heading line extension 520. At 530, the depth of the water is 30 meters. At 540, the depth of the water is 20 meters. At 550, the depth of the water is 30 meters. In another implementation, the depth information 530, 540 and 550 may be displayed as different colors on the heading line extension 520 to indicate different depths at different locations.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems. Ship instruments and equipment may be connected to the computing systems described herein for executing one or more navigation technologies. As such, the computing systems may be configured to operate using sonar, radar, GPS and like technologies.

The various technologies described herein may also be implemented in distributed computing environments where tasks are performed by remote processing devices that are linked through a communications network, e.g., by hardwired links, wireless links, or combinations thereof. In a distributed computing environment, program modules may be located in both local and remote computer storage media including memory storage devices.

FIG. 6 illustrates a computer system 600 into which implementations of various technologies and techniques described herein may be implemented. Computing system 600 may be a conventional desktop, a handheld device, a wearable device, a controller, a personal digital assistant, a server computer, an electronic device/instrument, a laptop, a tablet, or part of a navigation system, marine electronics, or sonar system. It should be noted, however, that other computer system configurations may be used.

The computing system 600 may include a central processing unit (CPU) 630, a system memory 626 and a system bus 628 that couples various system components including the system memory 626 to the CPU 630. Although only one CPU 630 is illustrated in FIG. 6, it should be understood that in some implementations the computing system 600 may include more than one CPU 630.

The CPU 630 can include a microprocessor, a microcontroller, a processor, a programmable integrated circuit, or a combination thereof. The CPU 630 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 630 may also include a proprietary processor. The CPU may include a multi-core processor.

The CPU 630 may provide output data to a Graphics Processing Unit (GPU) 631. The GPU 631 may generate graphical user interfaces that present the output data. The GPU 631 may also provide objects, such as menus, in the graphical user interface. A user may provide inputs by interacting with the objects. The GPU 631 may receive the inputs from interaction with the objects and provide the inputs to the CPU 630. In one implementation, the CPU 630 may perform the tasks of the GPU 631. A video adapter 632 may be provided to convert graphical data into signals for a monitor 634. The monitor 634 includes a screen 605. The screen 605 can be sensitive to heat or touching (now collectively referred to as a "touch screen"). In one implementation, the computer system 600 may not include a monitor 634.

The GPU 631 may be a microprocessor specifically designed to manipulate and implement computer graphics. The CPU 630 may offload work to the GPU 631. The GPU 631 may have its own graphics memory, and/or may have access to a portion of the system memory 626. As with the CPU 630, the GPU 631 may include one or more processing units, and each processing unit may include one or more cores.

The system bus 628 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 626 may include a read only memory (ROM) 612 and a random access memory (RAM) 616. A basic input/output system (BIOS) 614, containing the basic routines that help transfer information between elements within the computing system 600, such as during start-up, may be stored in the ROM 612. The computing system may be implemented using a printed circuit board containing various components including processing units, data storage memory, and connectors.

Certain implementations may be configured to be connected to a GPS and/or a sonar system. The GPS and/or sonar system may be connected via the network interface 644 or Universal Serial Bus (USB) interface 642. In one implementation, the computing system 600, the monitor 634, the screen 605 and buttons may be integrated into a console.

The computing system 600 may further include a hard disk drive 636 for reading from and writing to a hard disk 650, a memory card reader 652 for reading from and writing to a removable memory card 656 and an optical disk drive 654 for reading from and writing to a removable optical disk 658, such as a CD ROM, DVD ROM or other optical media. The hard disk drive 650, the memory card reader 652 and the optical disk drive 654 may be connected to the system bus 628 by a hard disk drive interface 636, a memory card interface 638 and an optical drive interface 640, respectively. The drives and their associated computer-readable media may provide nonvolatile storage of computer-readable instructions, data structures, program modules and other data for the computing system 600.

Although the computing system 600 is described herein as having a hard disk 650, a removable memory card 656 and a removable optical disk 658, it should be appreciated by those skilled in the art that the computing system 600 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 600. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 600 may also include a host adapter 633 that connects to a storage device 635 via a small computer system interface (SCSI) bus, a Fiber Channel bus, an eSATA bus, or using any other applicable computer bus interface. The computing system 600 can also be connected to a router 664 to establish a wide area network (WAN) 666 with one or more remote computers 674. The router 664 may be connected to the system bus 628 via a network interface 644. The remote computers 674 can also include hard disks 672 that store application programs 670.

In another implementation, the computing system 600 may also connect to one or more remote computers 674 via local area network (LAN) 676 or the WAN 666. When using a LAN networking environment, the computing system 600 may be connected to the LAN 676 through the network interface or adapter 644. The LAN 676 may be implemented via a wired connection or a wireless connection. The LAN 676 may be implemented using Wi-Fi technology, cellular technology, or any other implementation known to those skilled in the art. The network interface 644 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 674. It will be appreciated that the network connections shown are exemplary and other means of establishing a communications link between the computer systems may be used. The network interface 644 may also include digital cellular networks, Bluetooth, or any other wireless network interface.

A number of program modules may be stored on the hard disk 650, memory card 656, optical disk 658, ROM 612 or RAM 616, including an operating system 618, one or more application programs 620, program data 624 and a database system. The one or more application programs 620 may contain program instructions configured to perform methods 200 or 300 according to various implementations described herein. The operating system 618 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 600 through input devices such as a keyboard 662 and pointing device. Other input devices may include a microphone, joystick, game pad, satellite dish, scanner, user input button, wearable device, or the like. These and other input devices may be connected to the CPU 630 through a USB interface 642 coupled to system bus 628, but may be connected by other interfaces, such as a parallel port, Bluetooth or a game port. A monitor 605 or other type of display device may also be connected to system bus 628 via an interface, such as a video adapter 632. In addition to the monitor 634, the computing system 600 may further include other peripheral output devices such as speakers and printers.

Marine Electronics Device

FIG. 7 illustrates a schematic diagram of a marine electronics device 700 in accordance with various implementations described herein. The marine electronics device 700 includes a screen 705. In certain implementations, the screen 705 may be sensitive to touching by a finger. In other implementations, the screen 705 may be sensitive to the body heat from the finger, a stylus, or responsive to a mouse. The display device 700 may display marine electronic data 715. The marine electronic data types 715 may include chart data, radar data, sonar data, steering data, dashboard data, navigation data, forward looking sonar data, a bathymetric chart display as illustrated in FIG. 1A, a forward depth display as illustrated in FIG. 1B, a forward depth display with a depth warning as illustrated in FIG. 4, a navigation chart with a heading line extension and depth information as illustrated in FIG. 5 and the like. The marine electronics device 700 may display the depth information according to various implementations described herein. The marine electronics device 700 may also include a plurality of buttons 720, which may be either physical buttons or virtual buttons, or a combination thereof. The contents of the marine display device 700 are described in more detail with reference to FIG. 6.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon computer-executable instructions which, when executed by a computer, cause the computer to:
- receive a location and heading of a vessel;
- retrieve a bathymetric chart corresponding to the location;
- analyze the bathymetric chart, location and heading to determine depths at a plurality of locations in front of the vessel;
- display the depths as a curve or line on a graph, wherein the graph comprises a horizontal axis and a vertical axis, and wherein the horizontal axis corresponds to a distance from the vessel and the vertical axis corresponds to a depth; and
- display a warning if at least one of the depths is less than a preset minimum depth.

2. The non-transitory computer-readable medium of claim 1, wherein a maximum distance from the vessel for the plurality of locations is preset.

3. The non-transitory computer-readable medium of claim 1, wherein the computer-executable instructions further comprise computer-executable instructions that cause the computer to receive a speed of the vessel and use the speed to determine a maximum distance from the vessel for the plurality of locations.

4. The non-transitory computer-readable medium of claim 1, wherein the computer-executable instructions that cause the computer to display the depths comprise computer-executable instructions that cause the computer to display the depths on a navigation chart.

5. The non-transitory computer-readable medium of claim 1, wherein the computer-executable instructions that cause the computer to display the depths comprise computer-executable instructions that cause the computer to display the depths on a line or curve extending from a representation of the vessel in the direction of travel of the vessel.

6. The non-transitory computer-readable medium of claim 1, wherein the depths correspond to depths of contours on the bathymetric chart.

7. The non-transitory computer-readable medium of claim 1, wherein the computer-executable instructions that cause the computer to determine depths at a plurality of locations in front of the vessel comprise computer-executable instructions that cause the computer to calculate an estimate of the depths using a plurality of depths corresponding to contours on the bathymetric chart.

8. The non-transitory computer-readable medium of claim 7, wherein the computer-executable instructions that cause the computer to calculate an estimate of the depths comprise computer-executable instructions that cause the computer to average two or more of the depths corresponding to contours on the bathymetric chart.

9. The non-transitory computer-readable medium of claim 1, wherein the bathymetric chart comprises a plurality of contours corresponding to the depth of a body of water.

10. A non-transitory computer-readable medium having stored thereon computer-executable instructions which, when executed by a computer, cause the computer to:
- receive a location and heading of a vessel;
- receive a minimum depth;
- retrieve a bathymetric chart corresponding to the location;
- analyze the bathymetric chart, location and heading to determine depths at a plurality of locations in front of the vessel;
- compare the depths to the minimum depth; and
- display a warning if at least one of the depths is less than the minimum depth.

11. The non-transitory computer-readable medium of claim 10, wherein the computer-executable instructions that cause the computer to display the warning comprise computer-executable instructions that cause the computer to display a color to indicate the warning.

12. An apparatus for displaying marine electronic navigation data, comprising:
- one or more processors;
- a screen configured to display marine data; and
- memory having a plurality of executable instructions which, when executed by the one or more processors, cause the one or more processors to:
  - receive a location and heading of a vessel;
  - retrieve a bathymetric chart corresponding to the location;
  - analyze the bathymetric chart, location and heading to determine depths at a plurality of locations in front of the vessel;
  - display the depths on the screen; and display a warning if at least one of the depths is less than a preset minimum depth.

13. The apparatus of claim 12, wherein the executable instructions that cause the processor to display the depths on the screen comprise executable instructions that cause the processor to display the depths as a line or curve.

14. The apparatus of claim 12, wherein the executable instructions that cause the processor to display the depths comprise executable instructions that cause the processor to display the depths on a navigation chart.

15. The apparatus of claim 12, wherein the executable instructions that cause the processor to display the depths on the screen comprise executable instructions that cause the processor to display the depths using one or more colors.

16. The apparatus of claim 12, wherein the executable instructions that cause the processor to determine depths at a plurality of locations in front of the vessel comprise executable instructions that cause the processor to calculate an estimate of the depths using a plurality of depths corresponding to contours on the bathymetric chart.

17. The apparatus of claim 16, wherein the executable instructions that cause the processor to calculate an estimate of the depths comprise executable instructions that cause the processor to average two or more of the depths corresponding to contours on the bathymetric chart.

* * * * *